United States Patent [19]

Young et al.

[11] Patent Number: 4,559,608
[45] Date of Patent: Dec. 17, 1985

[54] ARITHMETIC LOGIC UNIT

[75] Inventors: William R. Young, Palm Bay, Fla.; Leon F. Parisoe, Raleigh, N.C.

[73] Assignee: Harris Corporation, Melbourne, Fla.

[21] Appl. No.: 460,061

[22] Filed: Jan. 21, 1983

[51] Int. Cl.[4] .............................................. G05F 7/50
[52] U.S. Cl. ..................................... 364/786; 364/736; 307/279; 307/448
[58] Field of Search ................ 364/716, 748, 749, 768, 364/778, 781, 786, 787, 788; 328/159; 307/471, 472, 481, 239, 248, 571, 577, 451, 452, 279, 448

[56] References Cited

U.S. PATENT DOCUMENTS

| | | | |
|---|---|---|---|
| 3,482,085 | 12/1969 | Smith, Jr. | 364/784 |
| 3,843,876 | 10/1974 | Fette et al. | 364/786 |
| 3,845,325 | 10/1974 | Daniels et al. | 307/451 |
| 3,925,651 | 12/1975 | Miller | 364/716 |
| 4,031,379 | 6/1977 | Schwartz | 364/786 |
| 4,049,974 | 9/1977 | Boone et al. | 307/471 |
| 4,052,604 | 10/1977 | Maitland et al. | 364/786 |
| 4,054,788 | 10/1977 | Maitland et al. | 364/786 |
| 4,070,590 | 1/1978 | Ieda et al. | 307/249 |
| 4,146,802 | 3/1979 | Moench | 307/279 |
| 4,149,099 | 4/1979 | Nagami | 307/279 |
| 4,215,416 | 7/1980 | Muramatsu | 364/768 |
| 4,218,747 | 8/1980 | Miura | 364/716 |
| 4,301,381 | 11/1981 | Clemen et al. | 307/279 |
| 4,321,492 | 3/1982 | Hollingsworth | 307/279 |
| 4,345,170 | 8/1982 | Sampson, III | 307/452 |
| 4,349,888 | 9/1982 | Smith | 364/716 |
| 4,425,623 | 1/1984 | Russell | 364/786 |
| 4,442,365 | 4/1984 | Nagami | 307/279 |

OTHER PUBLICATIONS

R. E. Goldschmidt "Dual-Mode Adder" IBM Technical Disclosure Bulletin vol. 10 #6, pp. 727–728, Nov. 1967.
Schmookler "Threshold Carry Look-Ahead for Parallel Binary Adder" IBM Technical Disclosure Bulletin, vol. 7 #6, pp. 451–452, Nov. 1964.

Primary Examiner—James D. Thomas
Assistant Examiner—Dale M. Shaw
Attorney, Agent, or Firm—Barnes & Thornburg

[57] ABSTRACT

An ALU having improved propagate and generate signal section as well as carry and sum logic section to decrease the propagation delays. The propagate and generate signal section is specifically designed to be used with a dual ported RAM such that transition of the precharged RAM outputs to the desired outputs are used to trigger the logic. Latches, which are an integral part of the output of the propagate and generate signal section and are latched by the high/low transition of the output and reset by precharge signal, are used in combination with a special control sequence of the logic select of the propagate and generate section to isolate the latch and output such that one of the buses though the ALU may be used as a bidirectional bus so that the ALU may write back into the RAM without intermediate registers or latches. To reduce the length of interconnects and number of crossovers when the ALU includes a shifter/swapper for BCD operations, the carry and sum logic units are grouped by nibbles and are interleaved. Also, the carry and sum logic of nibbles other than the first nibble have carry look ahead logic such that only a single delay is experienced per nibble to produce a carry nibble. The delay of the logic sections are reduced by precharging the drain of each of the FETs in the input logic.

29 Claims, 14 Drawing Figures

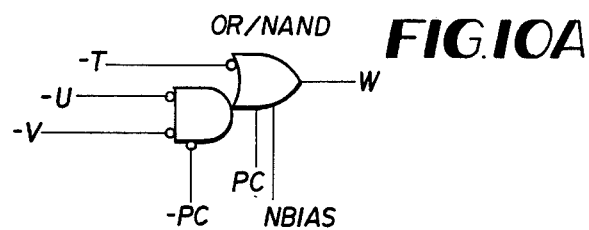
*FIG.10A*
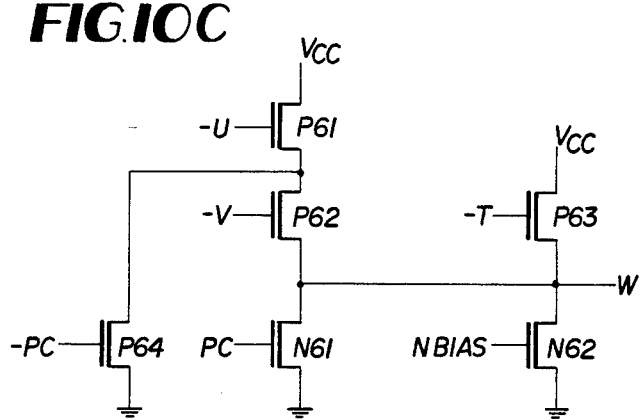
*FIG.10B*
*FIG.10C*
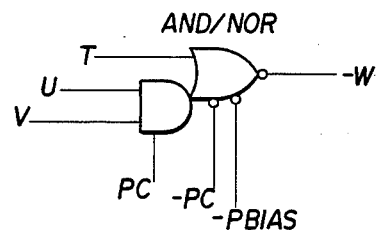
*FIG.9A*
*FIG.9B*
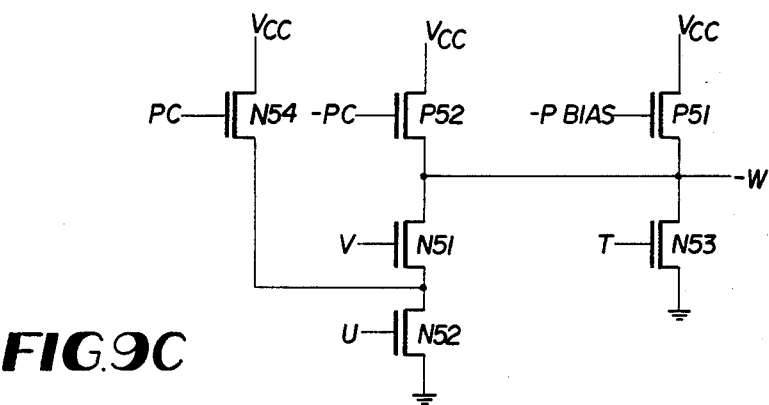
*FIG.9C*

ARITHMETIC LOGIC UNIT

BACKGROUND OF THE INVENTION

The present invention relates generally to an arithmetic logic unit (ALU) and, more specifically, to an improved arithmetic logic unit having reduced propagation delay.

An arithmetic logic unit, as illustrated in FIG. 1, generally includes an AND matrix 20 which receives two signals to be added $A_n$ and $B_n$ in its true and complemented form. The output of the AND matrix are the four combinations of the four input signals, namely, AB, A −B, −AB and −A−B. These AND terms are provided to a propagation OR gate matrix 22 and a generation OR gate matrix 24. The propagation OR gate matrix 22 receives all four of the signals wherein the generation OR gate matrix 24 receives only the first three of the AND signals. The propagation OR gate matrix 22 also is controlled by control signals K0 through K3 and the generation OR gate matrix 24 is controlled by the control signals L0 through L2. The control signals K0 through K3 and L0 through L2 select the appropriate combination from the AND matrix to produce the propagate signal $P_n$ and the generate signal $G_n$ to perform arithmetic functions, namely, addition of A plus B, substraction A minus B, substraction B minus A and A logical B. The propagate term $P_n$ is also known as the sum term and the generate term $G_n$ is also known as the product term. These signals are provided to carry and sum logic 26 which combines the propagation and generate signals with the carry-in signal $C_{n-1}$. It produces a sum signal $S_n$ and an output carry signal $C_n$. It should be noted that FIG. 1 is for a single digit and a plurality of them are used depending upon the size of the adder.

A typical example of arithmetic logic adder as illustrated in FIG. 1 is described in U.S. Pat. No. 4,263,660 to Priosde. The function select provides control signals to the propagate and generate OR gates whose output is provided to the logic transfer and carry look ahead circuits. This is a typical parallel adder with series carry propagate. The major problem of parallel adders is the delay produced by the series propagation of the carry signal. U.S. Pat. Nos. 4,052,604 and 4,054,788 to Maitland et al reduces the carry propagation time by calculating the carry of the least significant digits independent of the corresponding sum bits to allow propagation of the carry bits to the more significant bit before completion of the summation of the least significant digits. To increase the speed of the carry propagation, carry look ahead circuits have been provided.

Another method of reducing the number of elements used to perform the carry and sum signals as well as to decrease the propagation time of the carry is illustrated in U.S Pat. No. 3,843,876 to Fette et al wherein some common elements are used to simultaneously calculate the sum and the carry and precharges the carry line which is later discharged since a majority of the carry signals require charge lines. Another example of this type of circuit is illustrated in U.S. Pat. No. 4,152,775 to Schwartz.

The adder structure of FIG. 1 is the heart of an arithmetic logic unit and may be used to perform the multitude of functions including addition, subtraction and any logical combination of the two input variables $A_n$ and $B_n$. The ALU also includes a shifter/swapper at the output of the adder for shifting right and left as well as bit swapping. Prior art ALUs used input registers for the two words to be added A and B and an output register for the sum $S_n$. A prior art cycle generally includes for a binary coded decimal (BCD) in excess 3 code, adding the A register plus the constant 6 and storing the sum back in the A register in the first cycle, a second cycle of adding the A and B register and storing the sum and for the third cycle adding the sum plus a constant to derive the compensated binary coded decimal. The three cycles are independent and require three passes through the ALU and this requires an excessive amount of time. It should also be noted that prior ALUs use latches as well as registers for the storing of the sums and carries as well as for the propagate and generate signals. These latches and registers require control pulses which must be produced by additional circuitry and add delays.

SUMMARY OF THE INVENTION

An object of the present invention is to provide an arithmetic logic unit with reduced delay.

Another object of the present invention is to provide an arithmetic logic unit wherein the duration of each of the delays through individual logic gates are reduced.

Still another object of the present invention is to provide an arithmetic logic unit wherein the propagate and generate signals are especially designed for use with a random access memory.

Still a further object of the present invention is to provide an arithmetic logic unit which requires a minimum number of control signals.

A still even further object of the present invention is to provide a unique grouping and location of bits in the carry and sum logic so as to reduce the capacitance and time delays of the propagation of the carries.

A still even further object of the present invention is to provide improved carry and sum logic for a multi bit ALU which minimizes the delay per four bits.

An even further object of the present invention is to provide a generate and propagate signal generation system for an arithmetic logic unit which does not require the use of external registers or latches.

A still even further object of the present invention is to provide unique control in the propagate and generate signal section of the ALU such that one of the bit lines may be used as a multiplexed bidirectional bus.

Even a further object of the present invention is to provide a unique logic gate for use in an ALU which minimizes the delay through the logic gate.

These and other objects of the invention are attained by improvements in the propagate and generate section, and the sum and carry logic portions of an arithmetic logic unit and in specific logic gates.

The propagate and generate signal producing section is specifically designed to operate with dual ported random access memories wherein all the outputs of the random access memory are precharge logic high. The high to low transition on the desired lines produces the tripping of the logic. A unique latch is provided as an integral part of the output of the propagate and generate section which is responsive to the high/low transition from the precharge to a low logic state to latch in the value of the propagate signal and the generate signal for the bit. The latch is reset by a precharge signal. The AND gate section of the propagate and generate signal section includes P channel devices responsive to the high/low transition from the dual ported RAM. A precharge circuit is provided to remove any charge stored at the junction of the two serially connected P channel transistors to prevent a false true level from occurring. The function select gates determine which AND terms are used to produce the propagate and generate signals and are also used to isolate the propagate and generate output and latch from the inputs such that one of the inputs may be used as a bidirectional multiplexed bus so that information may be written from the ALU back to the RAM using the bus.

To reduce the number of crossovers as well as the length of crossovers in the ALU having a shifter/swapper performing BCD arithmetic, the carry and sum logic for each bit are arranged in nibbles of four bits and are interleaved such that the third nibble is positioned between the first and second nibble, and the second nibble is between the third and fourth nibbles. The structure of the individual nibbles are unique in that the first nibble includes no carry look ahead circuitry and, thus, requiring four logic delays from a carry-in to carry-out for the nibble. The subsequent nibbles are also uniquely designed to include a carry look ahead per nibble such that a carry to the nibble will become a carryout of the nibble requiring only one logic delay. The carry look ahead for the nibbles includes a first portion which determines whether all the propagate signals for bits of that nibble are high to be combined with a carry to produce a carryout of the nibble and a second carry look ahead portion which determines whether there is a carry generated within the bits of the nibble and if it is propagated by subsequent bits to the nibble carryout.

The sum logic includes exclusive ORs having one input from the propagate of that bit and the carry from the previous bit. The difference between the first nibble and subsequent nibbles is the carry of the previous bit is generated by separate and distinct logic for other than the first bits using the carry-in and the first and second carry look ahead means of the previous bit. A nibble carry latch is provided at the output of each nibble. As in the propagate and generate signal sections, the logic gates in the sum and carry logic include a pair of precharge transistors to precharge the drains of all logic input transistors of the logic gates. In addition to the precharge means, a transistor is provided to compensate for the leakage current of the logic transistors and, therefore, maintain the output of the logic gate at the precharge signal unless the desired logic condition is present to change the output logic level.

Other objects, advantages and novel features of the present invention will become evident upon review of the detailed description of the preferred embodiments with the accompanying drawings.

BRIEF DESCRIPTION OF THE DRAWINGS

FIGS. 9A, 9B and 9C are a logic diagram, a truth table and a schematic of an AND/NOR gate incorporating the principles of the present invention.

FIGS. 10A, 10B and 10C are a logic diagram, a truth table and a schematic, respectively, of an OR/NAND gate incorporating the principles of the present invention.

DESCRIPTION OF THE PREFERRED EMBODIMENTS

Figure 1:
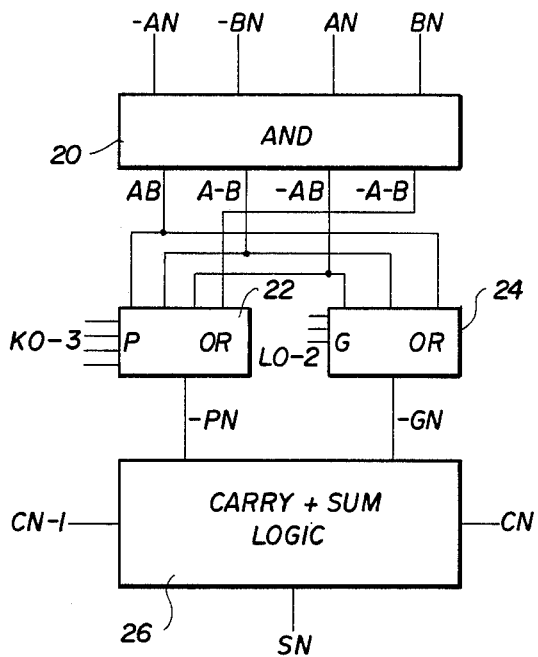
FIG. 1 is a block diagram of an arithmetic logic unit of the prior art.
Figure 2:
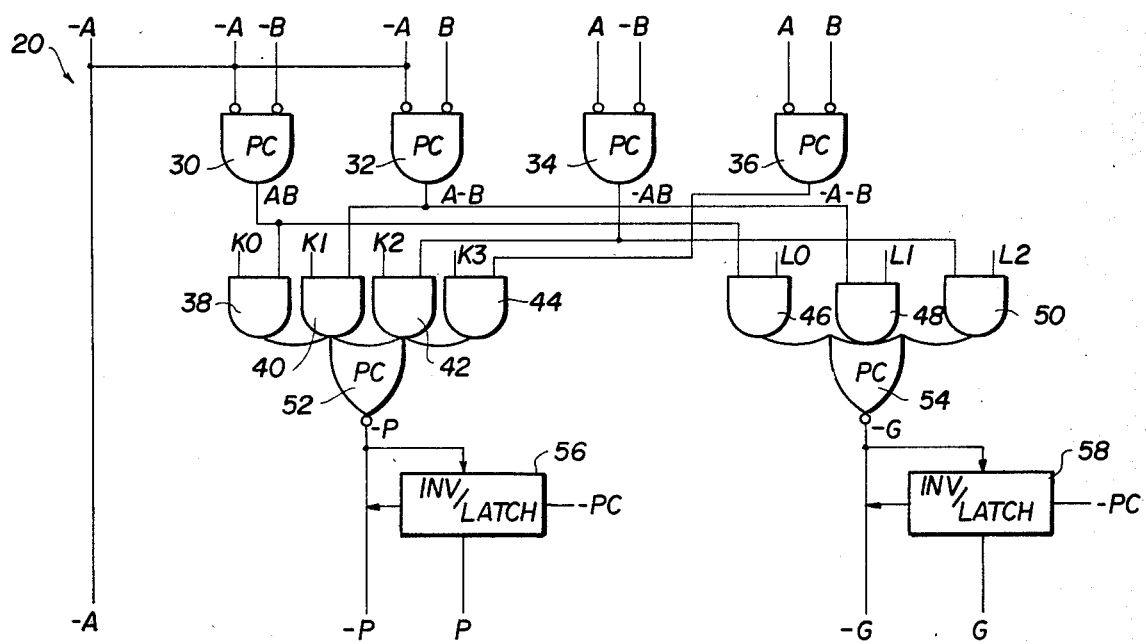
FIG. 2 is a logic diagram of the propagate and generate signal section incorporating the principles of the present invention.
Figure 4:
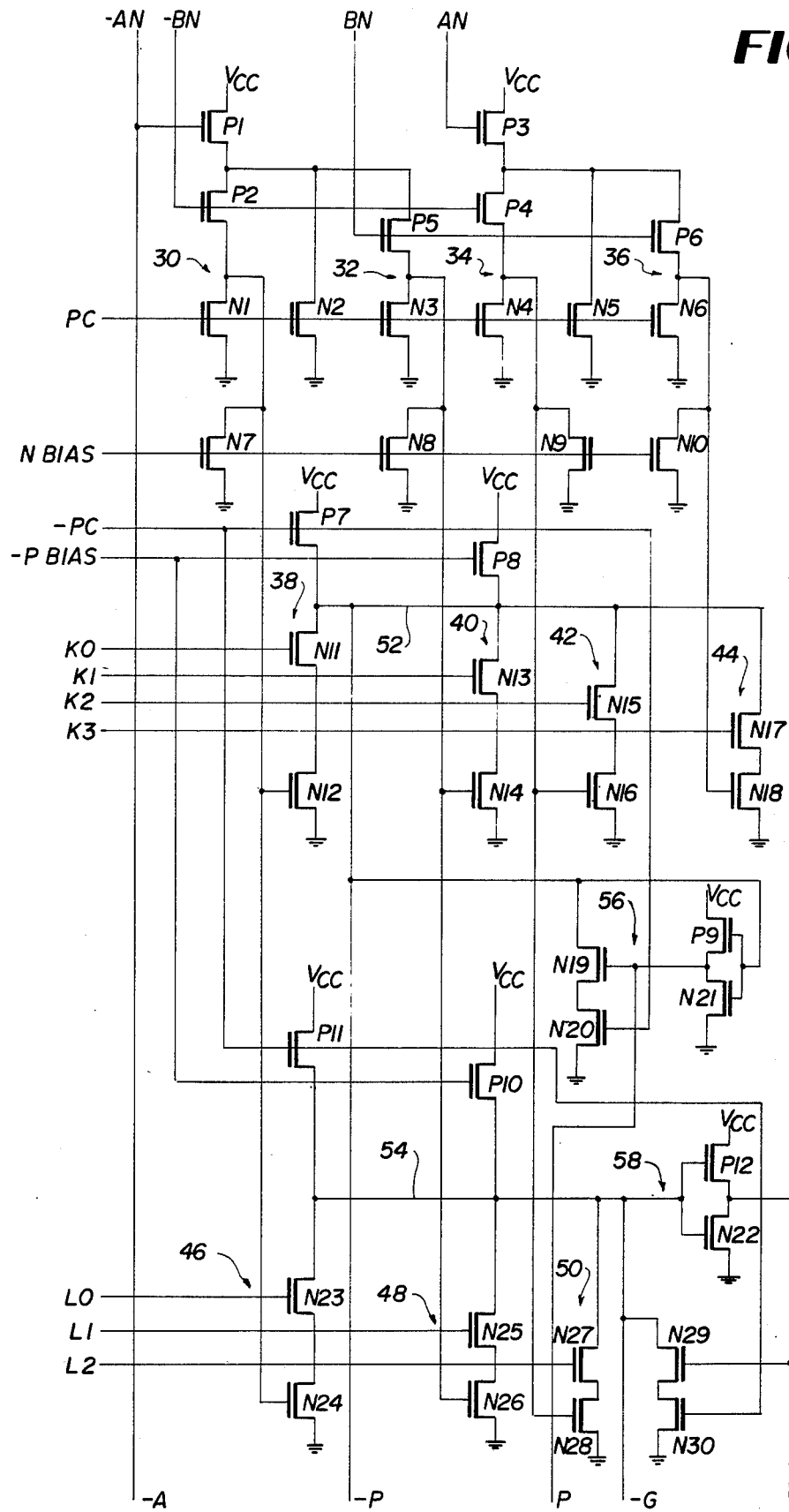
FIG. 4 is a schematic of the propagate and generate signal section of FIG. 2 incorporating the principles of the present invention.

The AND and OR matrices used to produce the propagate term $P_n$ and the generate term $G_n$ is illustrated in block diagram in FIG. 2 and in detail in FIG. 4. Turning to FIG. 2, the AND matrix includes a plurality of NOR gates 30, 32, 34 and 36 each receiving $-A$, $-B$; $-A$, $B$; $A$, $-B$ and $A$, $B$ signals, respectively, and produce output signals $AB$, $A-B$, $-AB$, $-A-B$, respectively. The $A$, $-A$, $B$, $-B$ signals are provided by a dual ported random access memory (RAM) which precharges all the outputs high. It should be noted that $A$ and $-A$ and $B$ and $-B$ are not complementary signals during precharging. It is this high to low transistion that will be used to trigger the circuitry of the AND and OR matrices. Thus, the NOR gates provide the AND function of the AND matrix 20 of FIG. 1. The NOR gates 30, 32, 34 and 36 also are provided with a precharge signal PC. The output of the four NOR gates 30, 32, 34 and 36 are provided to AND/NOR gates 38 40, 42, 44/52, respectively. The other input to the AND gates are the control signals K0, K1, K2 and K3, respectively. The outputs of NOR gates 30, 32 and 34 are also provided to a plurality of AND/NOR gates 46, 48, 50/54, respectively, which also receive control signals L0, L1 and L2, respectively. The AND gates 38, 40, 42, 44, 46, 48 and 50 function as transmission gates to select various combinations of the output of the NOR gates 30, 32 34 and 36 to be used depending upon the operation to be performed. NOR gates 52 and 54 receive the inverse precharge signal $-PC$. The output of NOR gate 52 is the inverse of the propagate signal $-P$ and the output of the NOR 54 is the inverse generate signal $-G$ which are provided directly as an output to the carry and sum logic. These signals are also inverted and latched by inverter/latches 56 and 58, respectively, which also receive the inverse of the precharge signal $-PC$. The output of inverter/latch 56 is the propagate signal P and it latches the inverse $-P$ and the output of inverter/latch 58 is the generate signal G and it latches the inverse $-G$. Thus, the inverter/latch 56 and 58 are an integral part of the propagate and generate logic and not a separate stage providing unnecessary delay and extra logic elements. As will be explained more fully below, the $-A$ bus passes through the propagate and generate signal generation section and is used as a multiplexed communication bus.

During the precharge cycle, the NORs 30, 32, 34 and 36 produce a low output to the AND gates in response to the high precharge signal PC. The input control signals K0, K1, K2, K3, L0, L1, L2 are all made high during precharge such that the AND gates 38, 40, 42, 44, 46, 48 and 50 are precharged for the other input from the NOR gates 30, 32, 34, 36, which is low during precharge. The inverse precharge signal $-PC$ to the NOR gates 52 and 54 maintain the $-P$ and $-G$ output of the NOR gates 52 and 54 high. At the end of the precharge cycle all but the desired K and L signals are turned off. This allows transmission of the outputs of the AND gates 30, 32 34 and 36 through selective AND gates 38, 40, 42, 44, 46, 48 and 50 to the NOR gates 52 and 54 and onto inverter/latches 56 and 58. The latches are activated by the inverse of the precharge signal −PC going high and is tripped by the −P or −G signal going low after precharge. Halfway through the cycle the −A bus is precharged and then written on to provide information back to the RAM. To isolate the NOR gates 52 and 54 and the latches 56 and 58 during the write back cycle, the K and L inputs to the AND gates 38, 40, 42, 44, 46, 48 and 50 are removed. This isolates the OR gates 52 and 54 from changes on the input signals A, −A, B, −B. The latches hold the values of the propagate and generate signals even though the input values for A and B have been changed.

Figure 3:
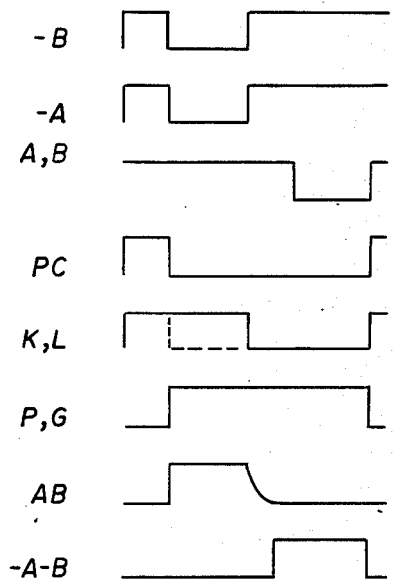
FIG. 3 is a graph of the signals from FIG. 2.

The relationship between the signals just described is illustrated in the graphs of FIG. 3. The A and B signals are shown as changing their value in the middle of the cycle after an −A bus precharge and write back. The output of the NOR gate 30 AB goes high after the precharge goes low depending upon the A, B inputs. The dotted line of the K, L graph indicates that undesirable K and L are turned off after the precharge cycle. The P and G outputs are both illustrated as high during the remainder of the cycle after the precharge. By the use of the latch and the timing of the control signals K0 through K3 and L0 through L2, the inputs can change without affecting the remainder of the circuit which must use the last propagate and generate signals $P_n$ and $G_n$, respectively.

It should be noted that there are only two propagation delays between the inputs and the generation of the propagate and generate signals, namely, one through the NOR matrix 30 through 36 and a second through the AND/NOR matrix 38 through 54. By using precharge signals on the NOR and AND/NOR gates, the duration of each of these delays is substantially reduced. Also, by using the inverse of the precharge signal to activate the latches which are tripped by the incoming signal from the NORs 52 and 54, no additional cycle time or special signal is needed to control the latches.

A detailed description of the NOR and AND/NOR matrix and inverter/latch of FIG. 2 is illustrated in FIG. 4. The NOR gate 30 includes transistors P1 and P2 which receive the input signals $-A_n$ and $-B_n$, respectively, and precharge transistors N1 and N2. The NOR gate 32 includes transistors P1 and P5 receiving signals $-A_n$ and $B_n$, respectively, and precharge transistors N2 and N3. The NOR gate 34 includes transistors P3 and P4 having input signals $A_n$ and $-B_n$, respectively, and includes precharge transistors N4 and N5. NOR gate 36 includes transistors P3 and P6 having input signals $A_n$ and $B_n$, respectively, and precharge transistors N5 and N6. All the precharge transistors N1, N3, N4 and N6 dissipate charge on the output line of the NOR gates, and the precharge transistors N2 and N5 dissipate the charge between the pair of serially connected P channel input devices. Thus, the drains of both P channel devices are precharged low. Transistors N7, N8, N9 and N10 are connected respective to the output of NOR gates 30, 32, 34 and 36 and are continuously biased on by signal N BIAS to sink the leakage current of the NOR gate.

The AND gate 38 includes transistor N11 whose gate receives K0 and N12 whose gate is connected to the output of the NOR gate 30. AND gate 40 includes transistor N13 whose gate receives the input K1 and N14 whose gate is connected to the output of NOR gate 32. AND gate 42 includes transistor N15 whose gate is connected to control signal K2 and N16 whose gate is connected to the output of NOR gate 34. AND gate 44 includes transistor N17 whose gate is connected to control signal K3 and N18 whose gate is connected to the output of NOR gate 36. The AND gates 38, 40, 42 and 44 are connected to a common line 52 to form NOR gate 52. To this common connection 52 is connected a precharge transistor P7 whose gate receives −PC and transistor P8 which is biased on by a −P BIAS signal to provide a current source for the leakage current of the AND gates 38, 40, 42 and 44. Also connected to the common NOR connection 52, which produces the signal −P, is the inverter/latch 56 which includes transistors P9 and N21 forming an inverter and transistors N19 and N20 forming a latch. The gate of N19 is connected to the output of the inverter and the gate of N20 is connected to the inverse of the precharge signal −PC.

The AND gate 46 includes transistor N23 having its gate connected to control signal L0 and N24 having its gate connected to the output of NOR gate 30. AND gate 48 includes transistor N25 having its gate connected to control signal L1 and N26 having its gate connected to the output of NOR gate 32. AND gate 50 includes transistor N27 having its gate connected to control signal L2 and N28 having its gate connected to the output of NOR gate 34. The AND gates 46, 48 and 50 are tied to a common line which forms NOR gate 54. Connected to this common line 54 is a precharge transistor P11 having its gate connected to the inverse precharge signal −PC and transistor P10 having its gate connected to the −P BIAS signal to provide a current source for the leakage current of AND gates 46, 48 and 50. The inverter/latch 58 includes transistors P12 and N22 forming an inverter connected to the NOR line 54 and transistors N29 and N30 forming a latch. The gate of transistor N29 is connected to the inverter and the gate of transistor N30 is connected to the inverse of the precharge signal −PC.

During precharge, the precharge transistors N1, N2, N3, N4, N5 and N6 discharge respective nodes while precharge transistors P7 and P11 precharge the output of NOR gates 52 and 54 high. The inverse of the precharge signal −PC disables the latches 56 and 58 by maintaining transistors N20 and N30 off. As indicated previously, all the control signals K0 through K3 and L0 through L3 are on during the precharge cycle. This allows the parasitic capacitance at the source of the K and L transistors N11, N13, N15, N17, N23, N25 and N27 to be precharged high during the precharge cycle. This will prevent false evaluation of the term P or G which might occur if the capacitance were not precharged. It should be noted that the specific implementation of the NOR, AND and NAND gates are not the typical inverter structure where the input is to both MOS devices. In the present application, the non-logic input device is controlled by the precharge signal. The logic operates quicker and minimizes propagation delay since it changes states from precharge at, for example, 20% versus 60% of full signal.

If the −P line of NOR gate 52 is low, the inverter provides a high output to turn on transistor N19 of the latch 56 which maintains the −P line low since N20 is activated by the −PC signal. If the −P of NOR 52 should subsequently go high impedance to ground, the latch 56 provides a path to ground and, therefore, prevents this signal from going high and being transmitted through the inverter to change the state of the latch. Thus, the latch 56 will stay activated until the lower transistor N20 is turned off during a precharge cycle. Latch 58 operates similar to latch 56 using the $-G$ output of the NOR 54. Thus, it can be seen that the latches 56 and 58 are self-activating and are reset by the precharge signal and do not require a special timing cycle. Also, the latches 56 and 58 are part of the internal structure of the NOR gate.

As in FIG. 2, FIG. 4 is but an example of the propagation and generate signals P and G, respectively, for the operation of one bit of a pair of words and the structure is duplicated for each bit of the ALU.

Figure 5:
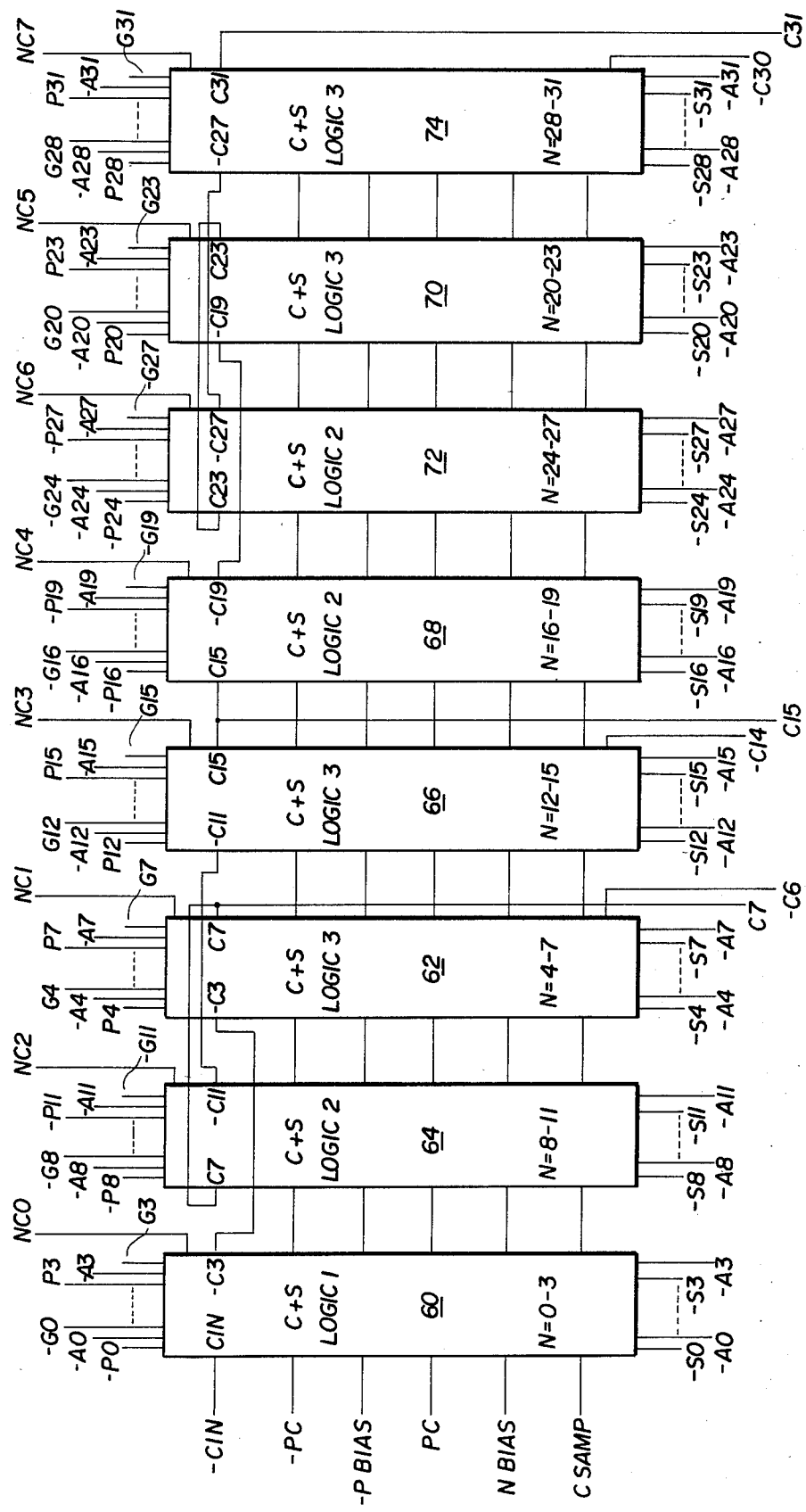
FIG. 5 is a block diagram of the interleaved carry and sum logic elements for a 32 bit ALU according to the principles of the present invention.

A 32 bit adder is illustrated in FIG. 5 including nibble carry and sum logic elements 60, 62, 64, 66, 68, 70 72 and 74. Each of the nibble carry and sum logic elements receive the propagate signal $P_n$ and the generate signal $G_n$ as well as the bus $-A_n$ for the four bits which constitute a nibble. The nibble carry and sum logic elements also receive a carrying in signal CIN, a precharge signal PC and its inverse $-PC$, the bias signals $-P$ BIAS and N BIAS and a carry sample control signal CSAMP for the nibble carry latch. The outputs of each of the carry and sum logic elements are a carry to the next stage $C_n$ and the sum $S_n$ as well as bus $-A_n$. The nibble carry $CN_n$ is also provided. The sums $S_n$ and the bus $-A_n$ are provided to additional logics as is well known in the art to provide shifts of input data as well as byte swapping. These additional elements are not shown as they are well known in the art.

Of particular interest in FIG. 5 is the interleaved arrangements of the nibbles relative to each other to provide a unique and optimum circuit layout and reduce the number of crossover conductors and their length. This reduction reduces the delay time. The savings is realized specifically in ALU including shifter/swapper performing BCD arithmetic. To be more specific, between the first four bits of nibble 60 and the second four bits of nibble 62 is the third four bits of nibble 64. The third four bits of nibble 64 is separated from the fourth four bits of nibble 66 by the second four bits of nibble 62. Nibble 68 of the fifth four bits is adjacent to the nibble 66 of the fourth four bits. The fifth and sixth nibbles 68 and 70, are separated by the seventh nibble 72 and the seventh nibble 72 and the eighth nibble 74 are separated by the sixth nibble 70.

Figure 7:
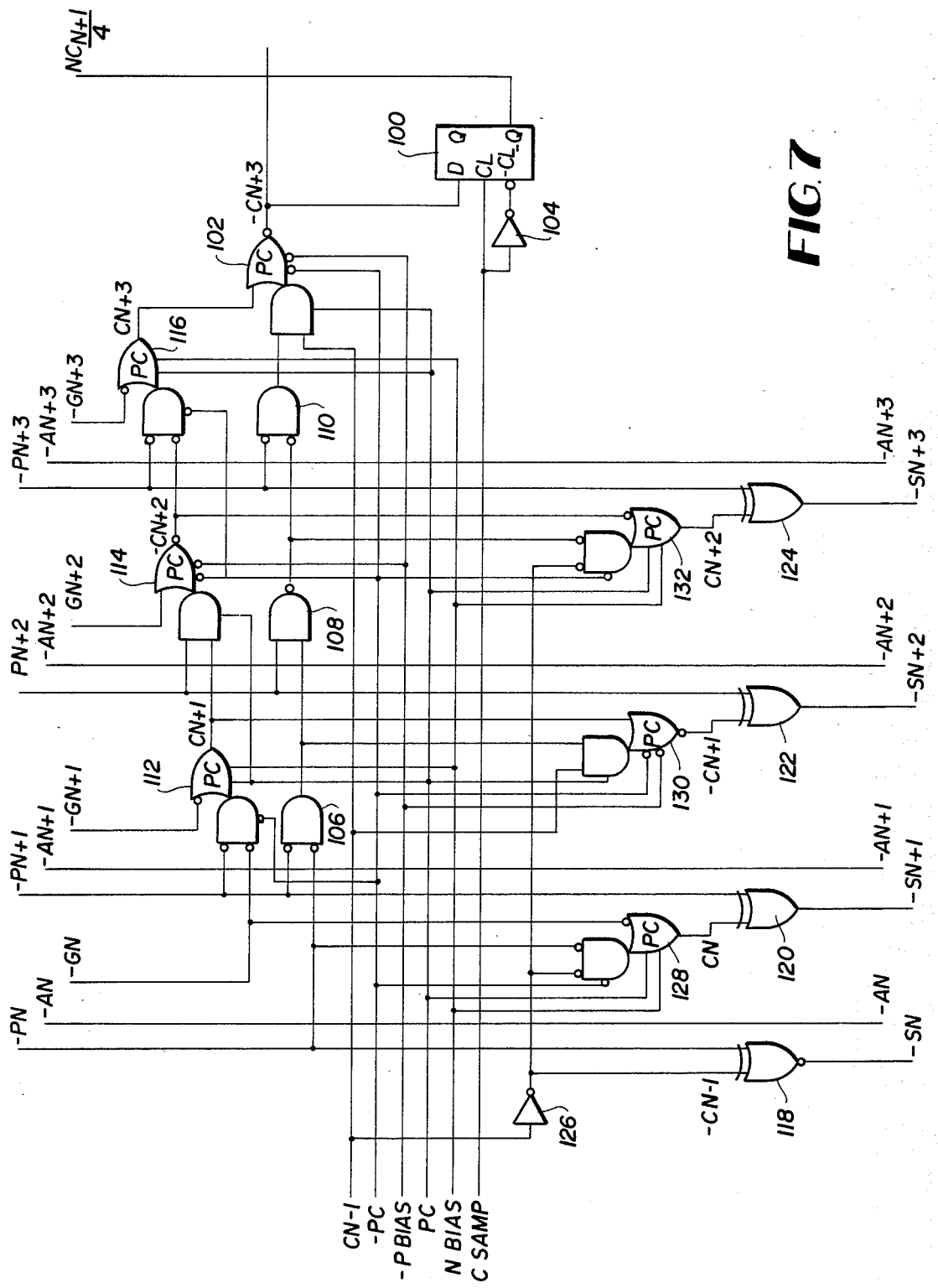
FIG. 7 is a logic diagram of a type 2 carry and sum logic.
Figure 8:
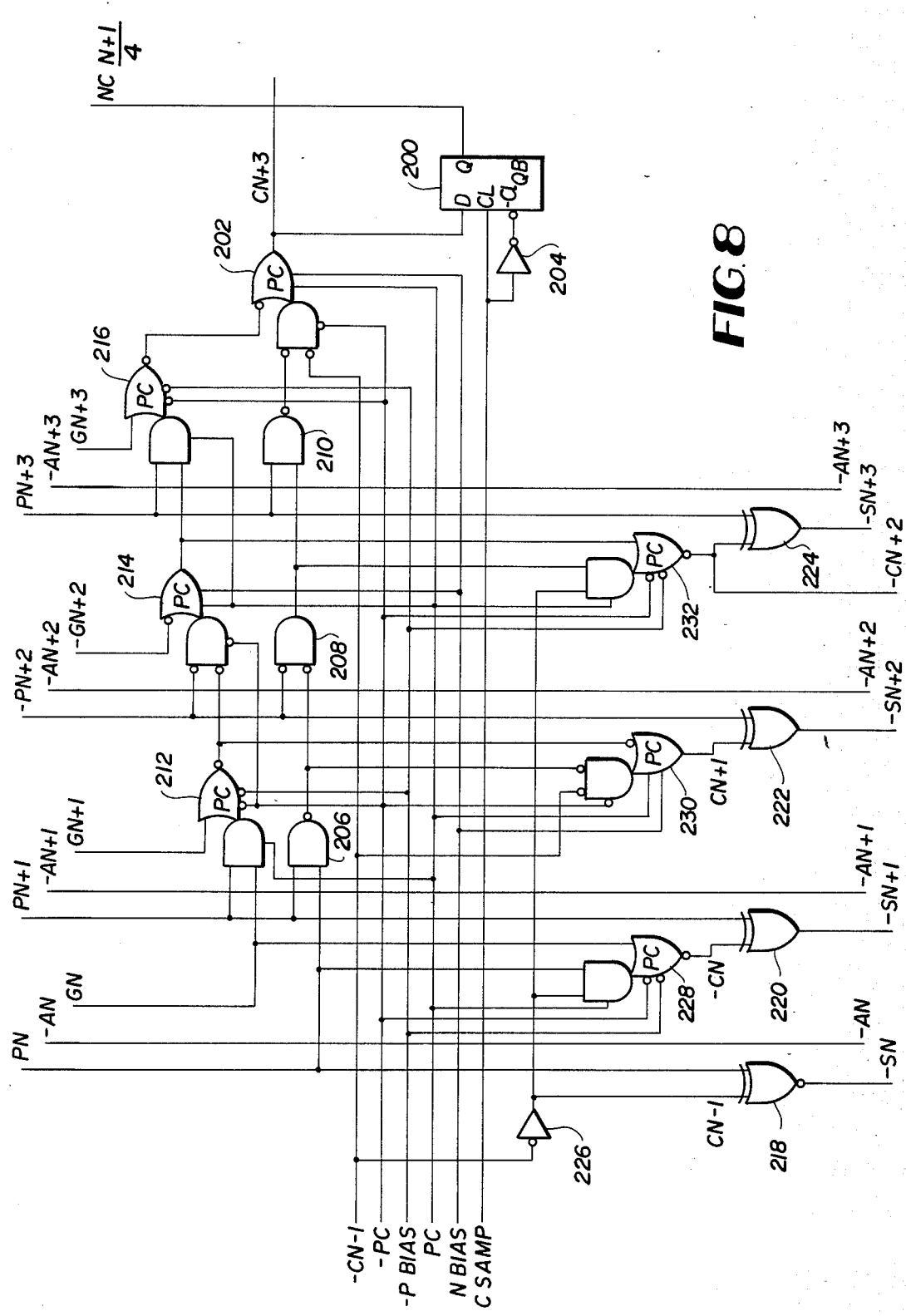
FIG. 8 is a logic diagram of a type 3 carry and sum logic.

As noted in FIG. 5, the first nibble carry and sum logic 60 is a type 1 logic whereas nibble carry and sum logic 64, 68 and 72 are type 2 logic and nibble carry and sum logic 62, 66, 70 and 74 are type 3 logic. The three types of carry and sum logics 1, 2 and 3 are illustrated in FIGS. 6, 7 and 8, respectively.

Figure 6:
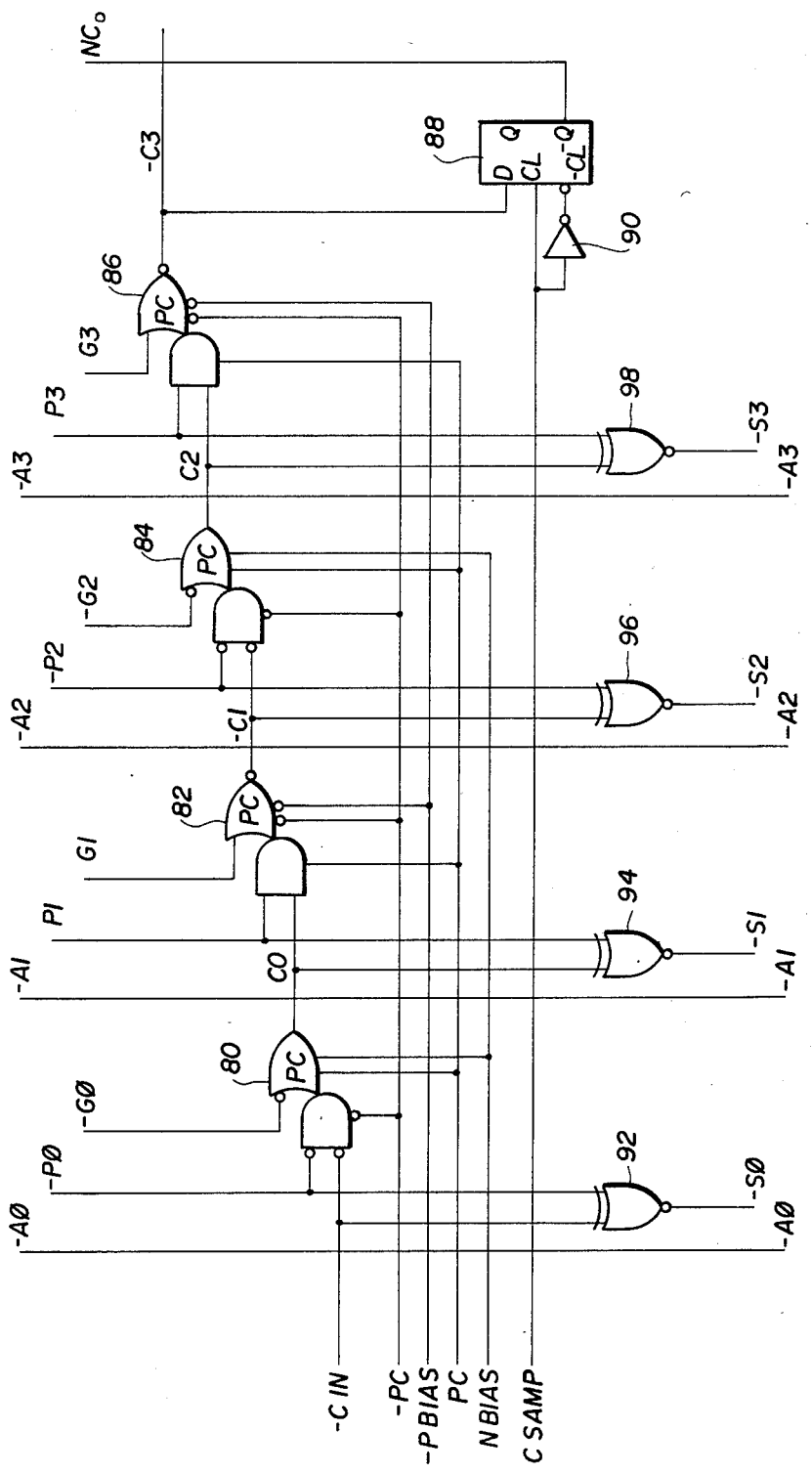
FIG. 6 is a logic diagram of a type 1 carry and sum logic

A type 1 carry and sum logic cell, as illustrated in FIG. 6, includes series connected or cascaded OR/NAND gate 80, AND/NOR gate 82, OR/NAND 84, and AND/NOR gate 86 to produce a carry if the generate signal $G_n$ for the bit is high or if propagate signal $P_n$ for that bit and the carry $C_{n-1}$ from the previous bits are high. The first gate 80 receives the carry-in $-CIN$ and provides a carry $C_o$ to the next bit gate 82 which in turn provides a carry $-C1$ to the next bit gate 84, which provides a carry C2 to gate 86 which produces a carryout $-C3$. This carryout $-C3$ of the four stages is also provided to a latch 88 which provides a nibble carry $NC_0$. Since the input to the latch 88 is negative or the inverse of the nibble carry, the nibble carry is taken from the inverse output $-Q$ of the latch 88. An inverter 90 provides an input to the inverse clock terminal of the latch 88 from the carry sample control signal CSAMP which also provides an input to the clock terminal of the latch 88.

The AND or OR portion of gates 80, 82, 84, 86 receive the carry $C_{n-1}$ from the previous bit as well as the propagate signal $P_n$ for that bit. The NAND or NOR portion of gates 80, 82, 84 and 86 receive the output of the AND or OR portion and the generate signal $G_n$ for that bit. As indicated by the truth table in FIGS. 9B and 10B, where $T=G_n$, $U=P_n$, $V=C_{n-1}$, $W=C_n$, gates 80, 82, 84, 86 produce a bit carry $C_n$ if the bit generate $G_n$ is high or if the bit propagate $P_n$ and the carry $C_{n-1}$ of the previous bits are high.

The carry and sum logic also includes exclusive NOR gates 92, 94, 96 and 98 for each bit. The carry $C_{n-1}$ from the previous bit as well as propagate signal $P_n$ for that bit are combined in the exclusive NOR gates to provide a sum output signal $-S_n$. Since the sum $-S_n$ is produced by an exclusive NOR the sign of the carry signal $C_{n-1}$ and $P_n$ is not important as long as they are the same. For exclusive NOR 92 and 96 the signs are negative and for exclusive NOR 94 and 98 the signs are positive.

The other inputs to the logic gates 80, 82, 84 and 86 are the precharge signals PC and $-PC$ and the biasing signals $-P$ BIAS and N BIAS. The AND or OR portion and the NAND or NOR portion both receive an appropriate precharge signal. As will be explained more fully below in connection with FIGS. 9 and 10, the precharge signals clear the internal nodes and charge the circuitry either high or low. This reduces the propagation delay produced by each stage.

As you will note the sign of the logic alternates between adjacent bits such that the negative carry-in to logic 80 produces a positive carryout $C_o$ to the second bit logic 82 which provides a negative carry $-C1$ to the input of the third bit logic 84 which produces a positive carry C2 to the fourth bit logic 86 which produces the negative carry signal $-C3$.

The type 1 carry and sum logic illustrated in FIG. 6 is the first stage or the first nibble with no carry look ahead capability. The carry-in is propagated through each of the four stages of the nibble. Thus, there are four stages of delay between the carry-in signal $-C_{in}$ and the carryout signal $-C3$. Whereas the type 1 carry and sum logic of FIG. 6 is designed to have four stages of delay using a minimum number of logic elements, the type 2 and 3 carry and sum logic cells as illustrated in FIGS. 7 and 8 use almost twice the number of elements than the type 1 carry and sum logic, but only have a single additional delay through the total four bits or nibble. The four bit delay of the type 1 cell allows for some internal propagation in the type 2 and 3 carry and sum logics. The increase in number of logic elements results from the design philosophy that the sum $S_n$ is calculated using substantially its own logic elements and the propagation of the carry signal is produced by separate logic elements.

To reduce the number of propagation delays through the nibble, a separate and distinct nibble propagation logic which makes the following two determinations for a nibble carry is used:

(A) A nibble carry-in from the previous nibble is propagated through the present nibble to produce a nibble carry-out if all of the propagate signals of the four bits of the present nibble are high; and (B) The nibble carryout is provided if a carry is generated within the nibble and propagated by subsequent bit propagate signals P.

Turning specifically to a type 2 carry and sum logic cell, illustrated in FIG. 7, the nibble carry $NC_{n+1/4}$ is provided on the $-Q$ output of latch 100 which has its input connected to the AND/NOR gate 102 whose output is the carry $-C_{n+3}$. The clock input of the latch 100 is connected to the carry sample signal CSAMP and its inverse clock input is connected to the inverse of the carry signal CSAMP by inverter 104. As discussed above, the nibble carryout $-C_{n+3}$ is low if the carry-in $C_{n-1}$ is high and all the propagate signals $P_n$ through $P_{n+3}$ are high. This logic function is performed by the cascaded NOR gate 106, NAND gate 108 and NOR gate 110 to the AND gate portion of AND/NOR gate 102. The carry-in $C_{n-1}$ is provided to the other input of the AND portion of gate 102. NOR gate 106 receives the inputs $-P_n$ and $-P_{n+1}$, NAND gate 108 has inputs $P_{n+2}$ and the output of NOR gate 106, and NOR gate 110 has an input from $-P_{n+3}$ and from the output of NAND gate 108.

The second condition which will produce a nibble carry is if a carry is produced within the nibble and it is propagated by the propagation signals. This second condition is provided as an input to the NOR portion of AND/NOR gate 102 by cascaded OR/NAND gate 112, AND/NOR gate 114 and OR/NAND gate 116. The input to the OR portion of gate 112 is the generate from the previous bit $-G_n$ and the propagate of that bit $-P_{n+1}$ and the input to the NAND portion is the generate $-G_{n+1}$ for that bit. The input to the AND section of gate 114 is the carry from the previous bit $C_{n+1}$ and the propagate for that bit $P_{n+2}$ and the input to the NOR section is from the generate $G_{n+2}$ for that bit. The input to the OR section of gate 116 is the carry signal $-C_{n+2}$ from the previous bit and the propagate signal $-P_{n+3}$ for that bit and the input to the NAND section is the generate $-G_{n+3}$ for that bit.

Since the inputs to the first group of cascaded gates 106, 108 and 110 are the output of the previous gate and the propagation signals P, there are three delays through this cascade portion. The second cascaded group of gates 112, 114 and 116 require three delays since they depend upon a carry signal from the previous gate. It should be noted that both cascaded groups operate independent of an input from the previous nibble and, thus, these delays are simultaneous with and not in addition to the delay of the first nibble which requires four delays. The additional delay for the nibble is produced by the nibble logic 102 since it must await, in the worst condition, for the carry-in signal from the previous stage $C_{n-1}$. Thus, for the nibbles of type 2 and 3 only one additional delay above that of the first nibble is produced.

The sum section of the type 2 carry and sum logic for the nibble includes exclusive NOR 118 and exclusive ORs 120, 122 and 124 whose inputs are the carry from the previous stage $-C_{n-1}$, $C_n$, $-C_{n+1}$, $C_{n+2}$, respectively, and the propagation signal for that stage $-P_n$, $-P_{n+1}$, $P_{n+2}$, $-P_{n+3}$, respectively, to produce the sums $-S_n$, $-S_{n+1}$, $-S_{n+2}$, $-S_{n+3}$, respectively. The carry-in $-C_{n-1}$ for the first NOR gate 118 is provided through inverter 126 from the input signal $C_{n-1}$. The carry for the previous bit for exclusive OR gate 120 is produced by OR/NAND gate 128 whose NAND gate receives the generate $-G_n$ from the previous bit and whose OR gate receives the inverse of the input carry $C_{n-1}$ and the propagate from the previous stage $-P_n$.

The exclusive OR gate 122 takes its carry from the previous stage $-C_{n+1}$ produced by the AND/NOR gate 130 whose NOR portion receives the nibble generated carry $C_{n+1}$ of the previous stage produced by the OR/NAND gate 112 and whose AND portion receives the nibble input carry $C_{n-1}$ and the combination of the first and second propagate signals $-P_n$ and $-P_{n+1}$ at the output of NOR gate 106. The exclusive OR gate 124 receives the carry from the previous stage $C_{n+2}$ from the OR/NAND gate 132 whose NAND gate receives the nibble generated carry signal from the previous section $-C_{n+2}$ from AND/NOR gate 114 and whose OR gate portion receives the inverse of the nibble input carry $C_{n-1}$ and the combination of the propagate signals for the first two bits $-P_n$ and $-P_{n+1}$ from the NOR gate 106 and the third propagation signal $P_{n+2}$ at the output of NAND gate 108.

It should be noted that there are a maximum of three delays through the sum portion, one through the inverter 126, one through the OR/NAND gate and one through the exclusive OR. Input to the sum logic elements 128, 130, 132 are from the internally generated carry signals from $-G_n$ and logic elements 112 and 114 and internally generated propagate signals from $-P_n$ and logic elements 106 and 108. There is no delay in setting up the sum logic elements 128, 130, 132 once the carry signal from the previous nibble $C_{n-1}$ is provided. Whereas in a type 1 carry and sum logic of FIG. 6, the delay for the sum of the fourth bit $-S_3$ is four, namely, three for the propagation of the carry-in $-C_{in}$ to the exclusive NOR 98 and one through the exclusive NOR 98. As in the type 1 carry and sum logic, the type 2 carry and sum logic precharges the AND/NOR and OR/NAND gates to reduce the propagation delay of each logic gate.

The type 3 carry and sum logic cells illustrated specifically in FIG. 8 operates the same as described for the 2 type carry and sum logic of FIG. 7, the differences being in the position of the elements for the alternating logic polarity. The latch 200 provides the nibble carry $NC_{n+1/4}$ from its Q output since the output of the OR/NAND logic 202 is the positive signal $C_{n+3}$. The carry look ahead for the carry-in and the all propagate high for the nibble bit signals is produced by the cascaded NAND gate 206, NOR gate 208 and NAND gate 210. The nibble generated input to the nibble carry logic 202 is provided by the cascaded AND/NOR 212, OR/NAND gate 214 and AND/NOR gate 216. The sums for the four bits of the nibble are produced by exclusive NOR gate 218 and exclusive OR gates 220, 222 and 224 whose inputs are from the respective propagate signal for that bit and the carry signal from the previous bit produced by inverter 226, AND/NOR gate 228, OR/NAND gate 230 and AND/NOR gate 232, respectively.

It should be noted that in the sum portion of the carry and sum logic of the type 2 and type 3 nibble of FIGS. 7 and 8, the exclusive NOR gates 118 and 218 use the carry and propagate signal of the same sign as was the case in the type 1 carry and sum logic of FIG. 6. The exclusive OR gates 120, 122, 124 of FIG. 7 and 220, 222 and 224 of FIG. 8 have inputs of the carry and propagate signal of opposite logic signs to produce the inverse of the sum of that bit.

For the 32 bit ALU of FIG. 5, the total delay through the carry and sum logic is 13 and includes four delays through the first carry and sum logic 60, seven delays of the carries through the next seven nibbles 62, 64, 66, 68, 70, 72 and 74 and an additional two delays through the sum logic of the last carry and sum logic 74 (since it takes three logic delays from the carry-in to the sum-out and one was for the carry-in to the carry-out). With the two delays through the AND/OR matrix which produce the propagate and generate signals, the 32 bit ALU has a total of 15 propagation delays.

The AND/NOR gates and the OR/NAND gates used in FIGS. 6, 7 and 8 are shown schematically in FIGS. 9C and 10C, respectively. As discussed above, the delay of these gates are reduced by precharging these gates to a specific logic level. The AND/NOR of FIG. 9C includes transistors N51 and N52 connected in series to form the AND portion of the gate with inputs V and U, respectively, to their gates. Transistor N53 whose gate input is T is connected to a common line which forms a NOR with the AND transistors N51 and N52. The output of the NOR portion is the signal −W.

Transistor P52 has the inverse of the precharge signal −PC as an input to its gate so as to provide a precharge of VCC to the drain of N51 and N53 and output line −W during a precharge cycle. Transistor N54 has the precharge signal PC connected to its gate to provide the voltage level VCC minus $V_{TH}$ (the transistor threshold voltage) at the junction between the AND transistors N51 and N52 to precharge the drain of N52. The transistor P51 is connected to the NOR output line −W and receives the biasing signal −P BIAS at its gate to provide a source of leakage current for the transistors N51, N52 and N53.

By precharging the output through transistor P52, the output remains high until either the input T is high so as to turn on transistor N53 and bring the output −W low or the inputs V and U are both high turning on transistors N51 and N52 which also brings the output −W low. For all other combinations, the output remains at its precharge condition and −W remains high, as illustrated in the truth table of FIG. 9B. By providing the precharge voltage VCC minus VTH at the junction of N51 and N52, the transistor N51 can turn on with transistor N52 off without causing the voltage at −W to be decreased by charge redistribution between the capacitance at −W and at the junction of N51 and N52.

The OR/NAND of FIG. 10C includes series connected transistors P61 and P62 whose inputs are −U and −V, respectively. The NAND section includes transistor P63 whose input signal is −T and whose drain is connected in common with the drain of P62 to form the NAND section with the output line W. Transistor N61 whose input is the precharge signal PC precharges the output W low by dissipating charge on the drains of P62 and P63. The precharge transistor P64 whose input is the inverse of the precharge signal −PC is connected to the connection of the OR transistors P61 and P62. Precharge transistor P64 dissipates the charge at the junction of transistors P61 and P62 during the precharge cycle. Transistor N62 is connected to the output line W, has a bias signal N BIAS at its gate and provides a sink for the leakage currents of the transistors P61, P62 and P63.

The precharge transistor N61 precharges the output line low and the line is not brought high unless input signal −T to the transistor P63 is low or the inputs −U and −V to the transistors P61, P62 are both low. For all other combinations, the output line W is maintained at its low precharge condition, illustrated in the truth table 10B.

It is evident from the description of the preferred embodiments that the objects of the invention are attained in that an improved arithmetic logic unit is provided. Although the present invention has been described and illustrated in detail, it is clearly understood that the same is by way of example and illustration only and is not to be taken by way of limitation. For example, the logic gates of FIGS. 9C and 10C use a transistor of the same conductivity type as the logic input transistors to precharge the common node between the two logic input transistors although this precharge transistor may be of opposite conductivity type as illustrated in the NOR gate of FIG. 4. Alternatively, the precharge transistors for the common node of the two input transistors in FIG. 4 may be of the same conductivity type instead of the opposite conductivity type as illustrated.

The spirit and scope of the present invention are to be limited only by the terms of the appended claims.

What is claimed is:

1. In an arithmetic logic unit having a first section for producing a propagate and a generate output signals from a pair of input variables per bit and logic select signals provided thereto, and a second section for producing a carry and a sum output signal from said propagate and generate signals, the improvement comprising:
    first precharge means in said first section for precharging the propagate and generate output signal to a first logic level in response to precharge signals;
    first latch means integral with said arithmetic logic unit and responsive to a transition of said propagate output signal from said first logic level to a second logic level for maintaining said propagate signal at said second logic level until the next precharge signal; and
    second latch means integral with said arithmetic logic unit and responsive to a transition of said generate output signal from said first logic level to a second logic level for maintaining said generate output signal at said second logic level until the next precharge signal.

2. The arithmetic logic unit according to claim 1 wherein said first and second latch means each include a first and second switch means, connected in series between the output terminal for said propagate or generate output signal and a source of second logic level signal, for latching said output terminal at said second logic level when both the switch means are activated, said first switch is activated by said first to second logic level transition, said second switch means is deactivated by said precharge signal.

3. The arithmetic logic unit according to claim 1 wherein one of said inputs is a bidirectional bus through said arithmetic logic unit and including means for writing onto said bidirectional bus from said arithmetic logic unit.

4. The arithmetic logic unit according to claim 3 including means connected to said first section for isolating said propagate and generate output signals and said first and second latch means from said inputs during a write from said arithmetic logic unit onto said bus.

5. The arithmetic logic unit according to claim 4 wherein said first section includes means for determining the arithmetic or logic operation used on said input variables to produce propagate and generate signals in response to said logic select signals and said isolation means includes said determining means which is totally deselected to perform said isolation.

6. In an arithmetic logic unit having a first section for producing the product terms of the true and complement of a pair of input variables per bit, a second section connected to said first section for producing a propagate and a generate output signals using product terms selected by logic select signals, and a third section for producing a carry and sum output signal from said propagate and generate signals, the improvement:
means for providing logic high and lows of said true and complement of said pair of input variables per bit after a precharge cycle and logic high for both said true and complements during said precharge; and
said first section includes for each bit a plurality of pairs of serial connected P channel field effect transistors each having their gate connected to an appropriate true or complement input variable to perform a NOR logic function.

7. The arithmetic logic unit according to claim 6, wherein said second section includes propagate latch means and generate latch means connected to the propagate and generate outputs and means to precharge said latch means.

8. The arithmetic logic unit according to claim 6 including a precharge means for precharging the drain of each of said P channel field effect transistors logic low.

9. In an arithmetic logic unit for performing binary coded decimal arithmetic of a plurality of bits having a carry and sum logic section and an output section for shifting right or left and swapping upper and lower bytes of the sum outputs of said carry and sum logic section, the improvement comprising said carry and sum logic being grouped by nibbles of four bits, the carry and sum logic of a first and second nibble being separated by the carry and sum logic of a third nibble and the carry and sum logic of said third nibble and a fourth nibble being separated by the carry and sum logic of said second nibble.

10. In a carry and sum logic unit for a plurality of bits including for each bit a carry means for producing a carry-out signal as a function of a carry-in signal, a propagate signal and generate signal, and a sum means for producing a sum signal as a function of said carry-in signal and said propagate signal, the improvement comprising:
said carry means of said first four bits being connected in series without carry look ahead, a carry-in to the first bit requires four logic delays to propagate to the output of the fourth bit carry means as a nibble carry; and
said carry means of the fifth and subsequent bits being connected in series with carry look ahead means for a nibble of four bits, a carry-in to the first bit of the nibble requires one logic delay to propagate a nibble carry to the output of the fourth bit of the nibble.

11. The carry and sum logic unit according to claim 10 wherein said carry look ahead means includes first carry look ahead means for producing a nibble carry if all the propagate signals are logic high and if carry-in to the nibble is logic high, and second carry look ahead means for producing a nibble carry if a carry is generated by the second, third or fourth bit of the nibble and the carry is propagated by subsequent bits to the output of the fourth bit of the nibble.

12. The carry and sum logic unit according to claim 11 wherein said sum means for each bit includes an exclusive OR means having two inputs, one of said inputs is the propagate signal for that bit and the other input is the carry from the previous bit.

13. The carry and sum logic unit according to claim 12 wherein said sum means for the second, third and fourth bits each include carry means for providing said carry from the previous bit input to said exclusive OR means if a carry is generated by said second carry look ahead means for the previous bit or if said carry-in to the nibble is high and the propagate signals of the previous bits in the nibble are high as determined by said first carry look ahead means.

14. The carry and sum logic unit according to claim 10 including latch means at the output of each nibble for sampling and storing the nibble carryout.

15. A logic gate comprising:
a first switch means having an input terminal connected to a first logic level source, an output terminal and a control terminal which is an input of said gate and controls the conduction between said input and output terminals of said first switch means;
a second switch means having an input terminal connected to the output terminal of said first switch means, an output terminal which is the output of said gate, and a control terminal which is another input of said gate and controls the conduction between said input and output terminals of said second switch means;
a first precharge means connected to said output terminal of said first switch means for precharging said output terminal of said first switch means to a second logic level; and
a second precharge means connected to said output terminal of said second switch means for precharging said output terminal of said second switch means to said second logic level.

16. A logic gate according to claim 15 including means connected to said output of said gate for maintaining said gate output at said second logic level after deactivation of said first and second precharge means except when both of said first and second switch means are conducting.

17. A logic gate according to claim 16 wherein said first and second switch means are transistors of a first conductivity type, said first precharge means includes a transistor of said first conductivity type, said second precharge means includes a transistor of a conductivity type opposite said first conductivity type, and said maintaining means includes a transistor of said second conductivity type.

18. A logic gate according to claim 16 wherein said first and second switch means are transistors of a first conductivity type, said first and second precharge means each include a transistor of a second conductivity type opposite said first conductivity type, and said maintaining means includes a transistor of said second conductivity type.

19. A logic gate according to claim 15 including a third switch means having an input terminal connected to said first logic level signal source, an output terminal connected to said gate output, and a control terminal which is a third input to said gate and controls the conduction between said input and output terminals.

20. A logic gate according to claim 19 wherein said first, second and third switch means are transistors of a first conductivity type, said first precharge means includes a transistor of said first conductivity type, and said second precharge means includes a transistor of a conductivity type opposite said first conductivity type.

21. A logic gate according to claim 19 wherein said first, second and third switch means are transistors of a first conductivity type, and said first and second precharge means each include a transistor of a conductivity type opposite said first conductivity type.

22. A logic gate according to claim 15 wherein said first and second switch means are transistors of a first conductivity type, said first precharge means includes a transistor of said first conductivity type, and said second precharge means includes a transistor of a second conductivity type opposite said first conductivity type.

23. A logic gate according to claim 15 wherein said first and second switch means are transistors of a first conductivity type, and said first and second precharge means are transistors of a second conductivity type opposite said first conductivity type.

24. A logic gate according to claim 15 wherein said first and second switches and said first and second precharge means are insulated gate field effect transistors.

25. The carry and sum logic unit according to claim 10, wherein each carry means and each sum means includes a precharge means connected to its output for precharging the output to a first logic level and a maintaining means connected to its output for maintaining said output at said first logic level after precharging until said carry means or sum means produces a carry-out or sum signal respectively.

26. A logic gate comprising:
a first switch means having an input terminal connected to a first logic level source, an output terminal which is the output of said gate and a control terminal which is an input of said gate and controls the conduction between said input and output terminals of said first switch means;
a first precharge means connected to said output terminal of said first switch means for precharging said output terminal of said first switch means to a second logic level; and
a maintaining means connected to said output of said gate for maintaining said gate output at said second logic level after deactivation of said first means except when said first switch means is conducting.

27. A logic gate according to claim 26 including a second switch means having an input terminal connected to said first logic level source, an output connected to said gate output and a control terminal which is another input of said gate and controls the conduction between said input and output terminals of said second switch means, and said maintaining means maintains said gate output at said second logic level except when either said first or second switch means are conducting.

28. A logic gate according to claim 26 including a second switch means in series between said first switch means and said first logic level source having an input terminal connected to said first logic level source, an output terminal connected to said input terminal of said first switch means, and a control terminal which is another input of said gate and controls the conduction between said input and output terminals of said second switch means, and said maintaining means maintains said gate output at said second logic level except when both said first and second switch means are conducting.

29. A logic gate according to claim 28 including a second precharge means connected to said output terminal of said second switch means for precharging said output terminal of said second switch means to said second logic level.

* * * * *